United States Patent [19]

Umekita

[11] Patent Number: 5,625,626
[45] Date of Patent: Apr. 29, 1997

[54] METHOD OF AUTOMATICALLY DETERMINING A TRANSMISSION ORDER OF PACKET IN A LOCAL AREA NETWORK AND APPARATUS FOR SAME

[75] Inventor: Kazuhiro Umekita, Tsuchiura, Japan

[73] Assignee: Hitachi, Ltd., Tokyo, Japan

[21] Appl. No.: 409,076

[22] Filed: Mar. 22, 1995

[30] Foreign Application Priority Data

Mar. 25, 1994 [JP] Japan .................................. 6-056300

[51] Int. Cl.$^6$ .............................................. H04L 12/413
[52] U.S. Cl. ............................................................ 370/448
[58] Field of Search ................................ 370/85.1, 85.2, 370/85.3, 85.6, 85.15, 94.1; 340/825.51; 455/58.1

[56] References Cited

U.S. PATENT DOCUMENTS

| | | | |
|---|---|---|---|
| 5,280,479 | 1/1994 | Mary | 370/85.6 |
| 5,315,591 | 5/1994 | Brent et al. | 370/85.6 |
| 5,319,642 | 6/1994 | Ota | 370/85.3 |
| 5,371,494 | 12/1994 | Singh et al. | 370/85.3 |

*Primary Examiner*—Benedict V. Safourek
*Attorney, Agent, or Firm*—Antonelli, Terry, Stout & Kraus, LLP

[57] ABSTRACT

A method of automatically determining an order of transmitting a packet for a local area network using the CSMA/CD protocol. In transmitting a packet from an arbitrary station I on the local area network while another station P is transmitting a packet, the packet of the station I is automatically classified into three cases. The first, denoted by letter [A] a packet whose transmission process is not completed, is at the station I before a requested time if transmission starts after the transmission packet of the other station P is transmitted completely. The second, denoted by letter [B], is a packet whose transmission process does not completed at the station I before a requested time if transmission of another station Q is permitted after the transmission packet of the other station P is transmitted completely. The third, denoted by letter [C], is a packet which does not belong to cases [A] and [B]. A transmission process of the packet is performed in accordance with the classification result.

32 Claims, 8 Drawing Sheets

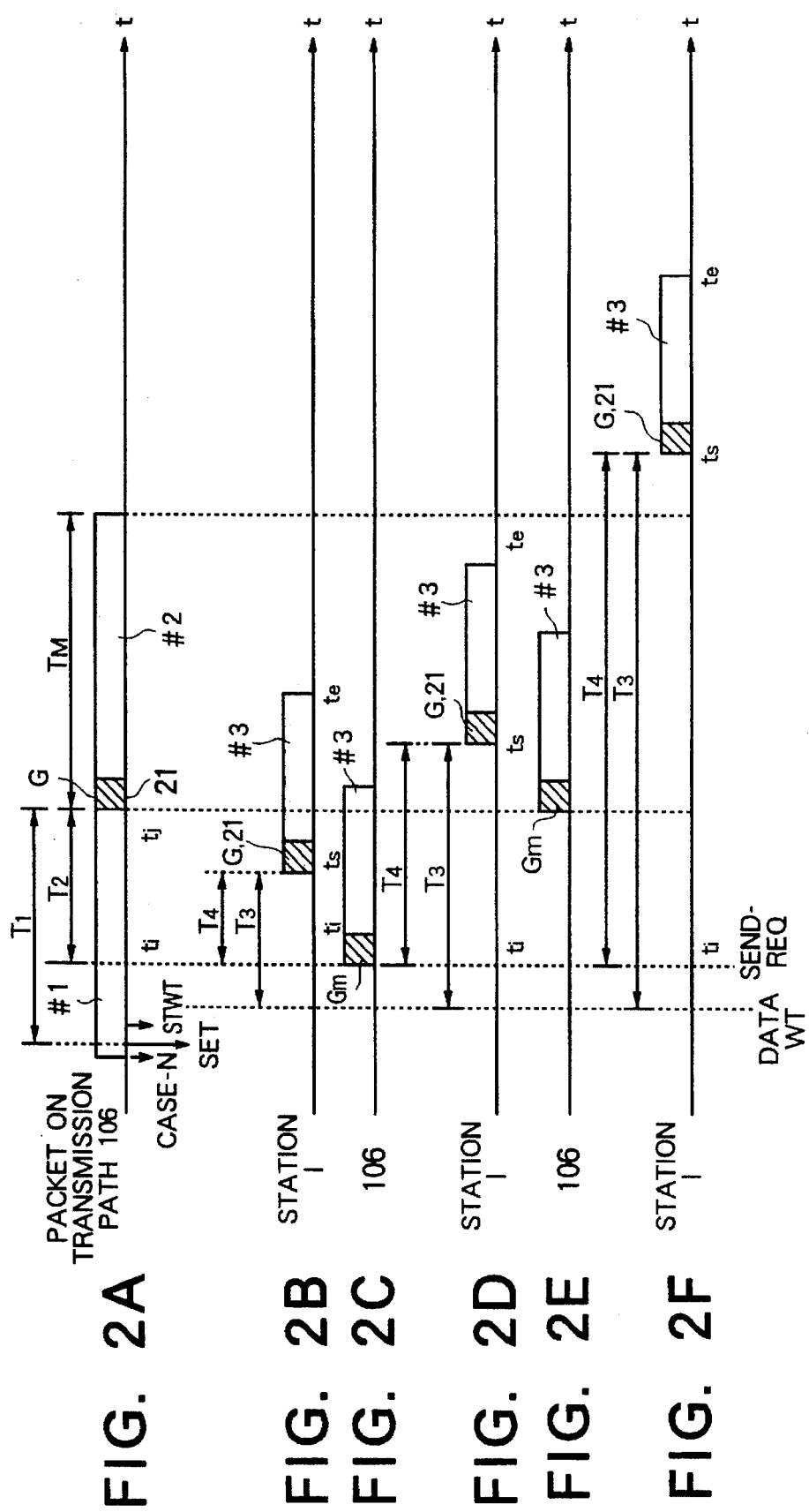

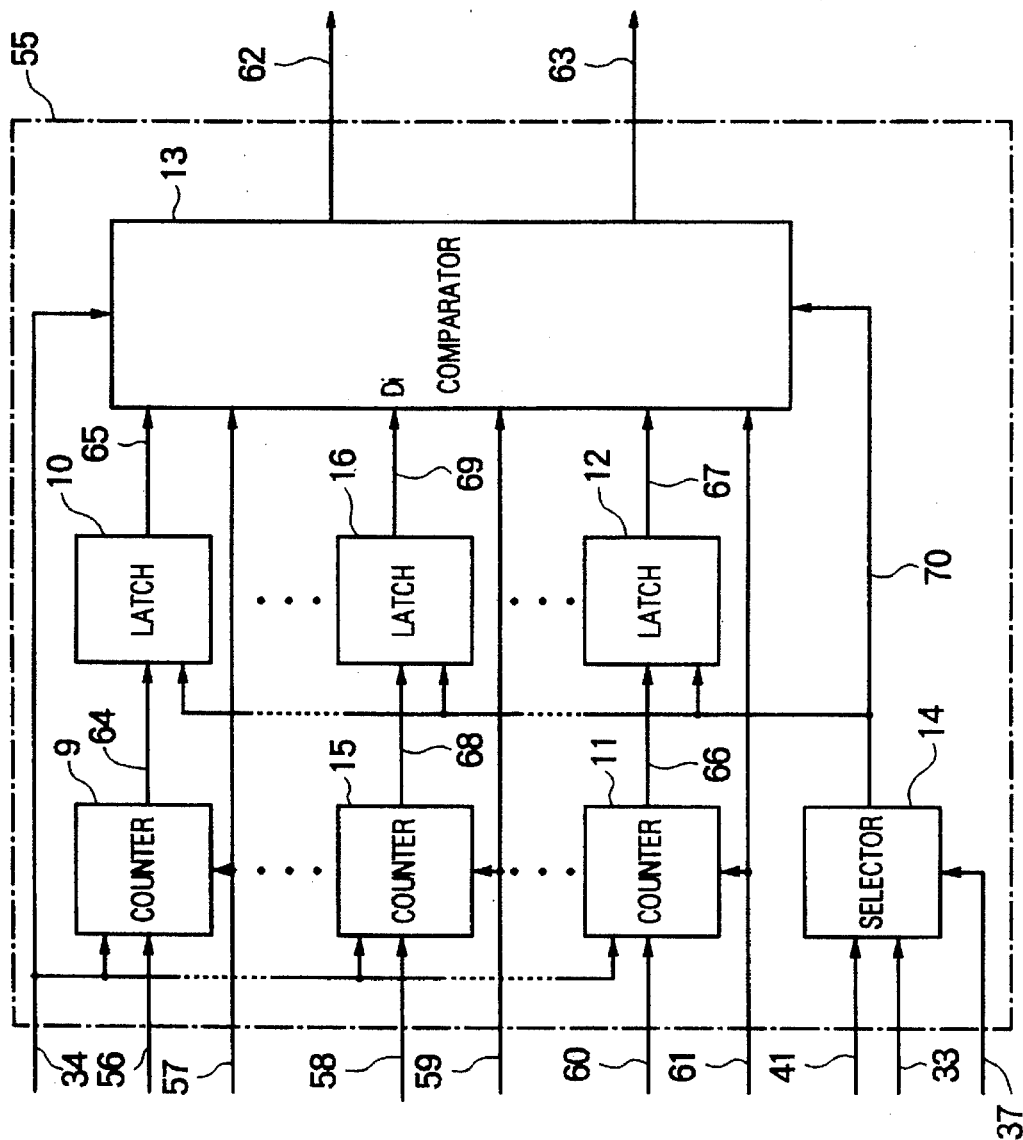

METHOD OF AUTOMATICALLY DETERMINING A TRANSMISSION ORDER OF PACKET IN A LOCAL AREA NETWORK AND APPARATUS FOR SAME

BACKGROUND OF THE INVENTION

The present invention relates to a method and apparatus for automatically determining a transmission order of packets in a local area network (LAN) which uses the CSMA/CD protocol.

The CSMA/CD protocol is an ISO standard for the lower two physical and data link layers (in broad sense), particularly for the data link layer (in narrow sense), of the OSI reference model of LAN developed by the IEEE. All stations on LAN with the CSMA/CD protocol are equally dealt with so that it is insufficient for coping with the situation when communications are required to have a transmission order (priority order) of stations. Methods of communications with a transmission order of data have been proposed, such as disclosed in Japanese Patent Laid-open Publication Nos. 2-149041 and 3-268534.

With these conventional techniques, a given transmission order is obeyed and no technique regarding a means for controlling a transmission order is disclosed therein.

With the technique disclosed, for example, in Japanese Patent Laid-open Publication No. 2-149041, a privileged station having a priority of a transmission process over other stations determines, only from the priority order of a transmission packet of its own station, whether or not the privilege can be exercised. Therefore, there is a possibility that urgent communications by another station is intercepted. As a result, the real time performance, i.e., the urgent-station-first performance of the whole network system may be lowered.

SUMMARY OF THE INVENTION

An object of the present invention is to provide a method and apparatus for automatically determining a transmission order of transmission packets on a LAN, capable of improving the real time performance of LAN by determining/controlling the transmission order of transmission packets, obeying the transmission order, and managing transmissions on LAN.

According to the present invention, as shown in FIGS. 2A to 2F, a packet is classified into three cases [A] to [C] in accordance with the results of comparison between the time durations $T_2$ and $T_4$. The time duration T2 is a remaining transmission time duration of a transmission packet of a station P on LAN, from a time when another arbitrary station I issues a transmission request to a time when the transmission by the station P is completed. The time duration $T_4$ is the allowable latest transmission start time $t_s$ from when the transmission request SEND-REQ is issued by the station I. If the packet is transmitted at this latest transmission start time $t_s$, it can be transmitted before the dead line D.L. time $t_e$.

[A]: In this case, if a packet starts being transmitted after the transmission packet of the other station P is transmitted completely, the packet cannot be transmitted before the dead line D.L.

In this case, if the packet transmitted by the other station P has a priority order status (hereinafter abbreviated STATUS) of "1" (inactive), transmission of the packet by the other station P is intercepted and after a wait of the minimum frame gap, a transmission packet of the station I added with STATUS=0 is transmitted. (FIG. 2C)

If the packet transmitted by the other station P has STATUS of "0" (active), i.e., if interception of the packet is not permitted, the process same as the case [B] is performed.

[B]: In this case, if a packet starts being transmitted after the transmission packet of the other station P is transmitted completely and the transmission of another packet of another station Q is permitted, the packet cannot be transmitted before D.L.

In this case, after the transmission of the packet by the other station P is completed, the minimum frame gap is waited and a transmission packet added with STATUS=0 is transmitted. (FIG. 2E)

[C]: Cases other than the cases [A] and [B]

In this case, a usual CSMA/CD protocol transmission process is performed by adding proper STATUS information to the packet.

If the other station is not transmitting, a usual CSMA/CD protocol transmission process is performed by adding a proper priority order status STATUS to the packet. If a transmission is not succeeded by a collision detection or a failure during transmission, a usual CSMA/CD protocol transmission process is performed by adding STATUS=1 to the packet.

According to the present invention, under the above conditions, if there are a plurality of packets to be transmitted in the transmission buffer of an arbitrary station on LAN, T4 (as defined previously) of each packet is compared. A packet having the minimum T4 is determined as the transmission packet of the station I.

With the above arrangement, in the case [A], even if a packet transmission request by its own station is issued while the other station P transmits a packet, the packet of its own station can be completely transmitted before D.L. except the following conditions.

(1) The transmission packet by the other station P has STATUS=0.

(2) A collision occurs during a packet transmission by its own station after the completion of a packet transmission by the other station P and the minimum frame gap.

(3) A transmission is not succeeded because of a failure or a collision during a packet transmission.

With the above arrangement, in the case [B], even if a packet transmission request by its own station is issued while the other station P transmits a packet, the packet of its own station can be completely transmitted before D.L. except under the following conditions:

(1) A collision occurs during a packet transmission by its own station after the interception of a packet transmission by the other station P and the minimum frame gap.

(2) A transmission is not succeeded because of a collision or a failure during a packet transmission.

With the above arrangement, even if there are a plurality of packets to be transmitted in the transmission buffer of an arbitrary station I of LAN, the transmission process can start from the packet having the shortest time to D.L. As a result, it becomes possible to manage transmission on LAN by determining/controlling the transmission order of transmission packets, and obeying the transmission order.

According to the present invention, a transmission order of packets can be automatically determined and controlled, transmissions on LAN can be managed by obeying the transmission order, and transmission processes can be performed while getting ready before the transmission dead line of each packet, so long as the transmission request conditions of the CSMA/CD protocol are satisfied. Accordingly, the real time performance of LAN can be improved.

BRIEF DESCRIPTION OF THE DRAWINGS

FIGS. 2A to 2F are diagrams explaining a method of determining a transmission order of packets according to the invention.

FIG. 8 is a diagram showing an embodiment of the write-buffer-associated transmission order determining circuit shown in FIG. 7.

DESCRIPTION OF THE PREFERRED EMBODIMENTS

In a local area network using the CSMA/CD protocol of the invention, in transmitting a first packet from an arbitrary station P connected to the local area network, the first packet is added with a code representing an importance degree of the first packet. In transmitting a second packet from another arbitrary station I connected to the local area network during the transmission of the first packet from the station P, the second packet is transmitted after judging the code representing an importance degree of the first packet. An embodiment of the code representing an importance degree of a packet is a code indicating whether or not an interception of a packet under transmission is permitted or not. The station I transmits the second packet at a timing determined in accordance with a code representing an importance degree of the second packet and the transmission end time appointed by the second packet.

Figure 1:
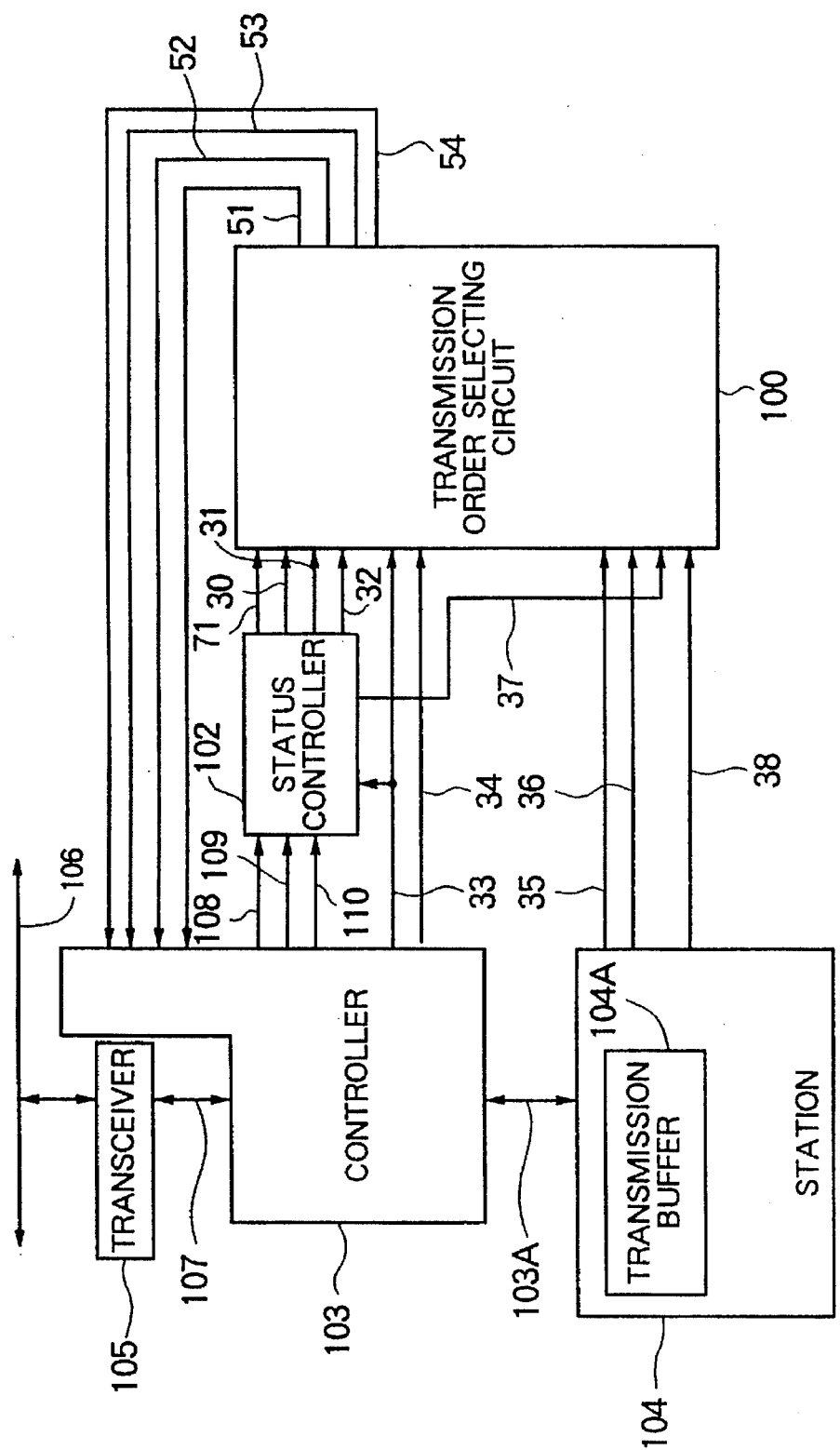
FIG. 1 is a circuit block diagram showing an embodiment of the invention.

FIG. 1 is a block diagram of a circuit for automatically determining a packet transmission order according to an embodiment of the invention.

Figure 4:
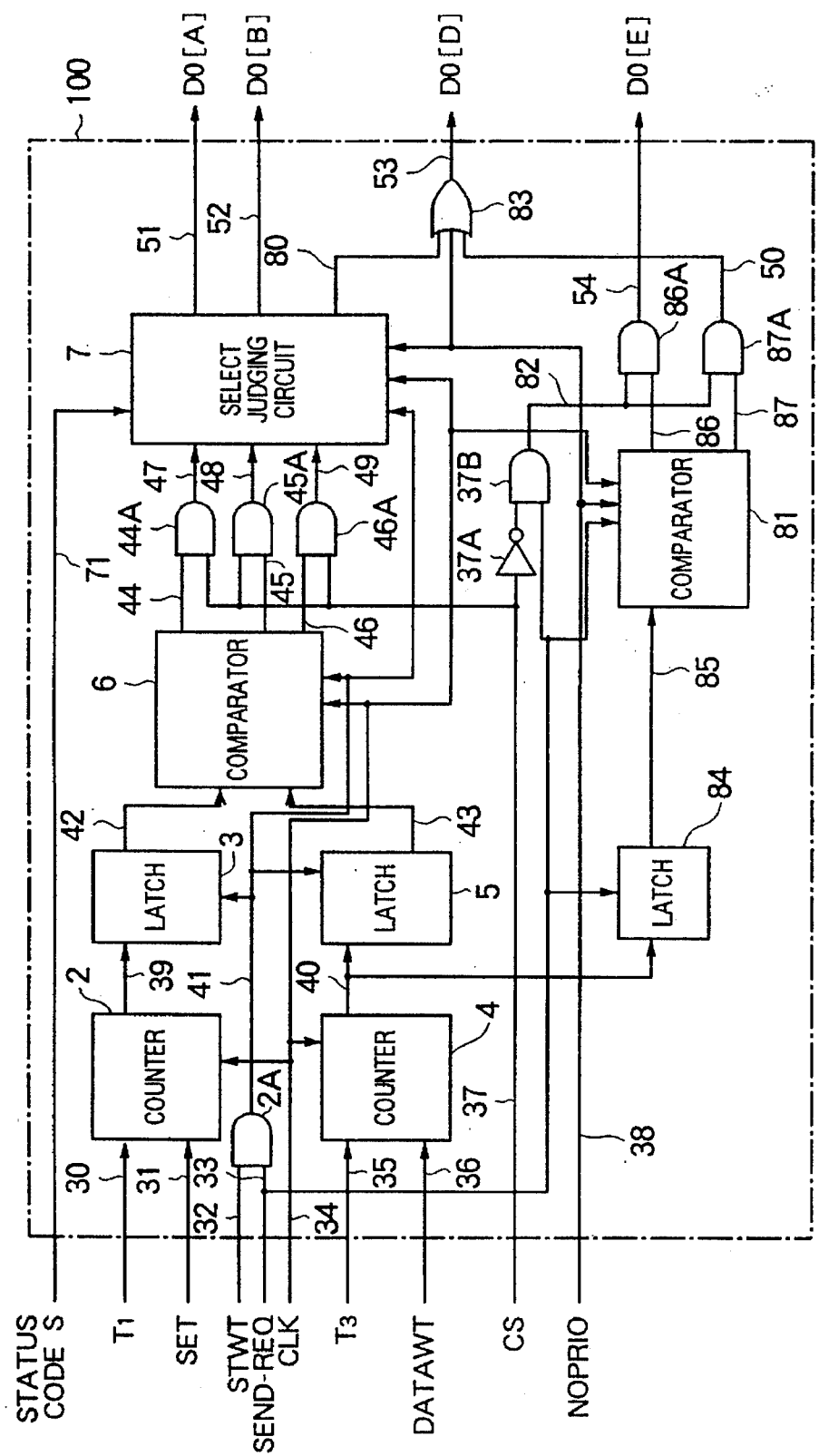
FIG. 4 is a diagram showing an embodiment of the transmission order selecting circuit shown in FIG. 1.

An example of the structure of a transmission order selecting circuit 100 in FIG. 1 is shown in FIG. 4.

Referring to FIG. 1, a transmission path 106 is a line connecting a LAN. A number of stations ST are connected in parallel to this transmission path 106. In FIG. 1, one station 104 is shown to be connected to the transmission path 106. The transmission path 106 is connected to a controller 103 via a transceiver 105 and a transceiver cable 107. The controller 103 is connected to the station 104 which is one of a number of network stations. An example of the station 104 is a controller, a personal computer, and other devices. The station 104 has a transmission buffer 104A. The controller 103 performs various processes such as serving as an interface with the station 104, performing assembly/disassembly of a data capsule, link management, and encode/decode functions. The link management process includes usual link management by the CSMA/CD protocol, and other link managements such as those disclosed in Japanese Patent Laid-open Publication Nos. 2-149041 and 3-268534. This configuration allows usual CSMA/CD communication processes to be performed, and can be easily realized by ordinary persons skilled in the art. In this embodiment, a status controller 102 and a transmission order selecting circuit 100 are added to the above configuration.

The input/output relation among the status controller 102, controller 103, station 104, and transmission order selecting circuit 100 shown in FIG. 1 is as follows.

Transceiver cable 107: A signal line for interconnecting the transmission path 106 and controller 103 via the transceiver 105.

Signal line 103A: A signal line for interconnecting the controller 103 and station 104. It is used for transmitting a transmission packet and receiving a reception packet. It includes other various control signal lines.

Signal line 33: A transmission request SEND-REQ for requesting to transmit a transmission packet #3 from its own station 104 is sent via this line. The transmission request SEND-REQ is used for determining a transmission time and a transmission order. The transmission request SEND-REQ is also used for acquiring a transmission right on the transmission path 106 via the cable 107.

Signal line 34: A clock signal is sent via this line. This clock signal is generated by hardware of the controller 103. This clock signal is not a clock signal for transmission and reception data bits, but rather is a clock signal generated at a fixed interval. Furthermore, this clock signal is used for a down count of counters 2 and 4 to be described later, and for a comparison timing for a comparator 3 also to be described later.

Signal line 35: A time duration $T_3$ (FIGS. 2B, 2D, and 2F) determined by a data type is sent via this line. The time duration $T_3$ is generated by the station 104. The time duration $T_3$ is a time duration from a time (Data WT) when a transmission packet #3 is written in the transmission buffer 104A of the station 104 to the latest transmission start time $t_s$. This time duration $T_3$ is calculated from the Data WT time, a given time $t_e$, a known data length, and an overhead time duration 21 (FIGS. 2A to 2F), and is outputted onto the signal line 35.

The overhead time duration is a longer one of either a time duration from when a packet transmission process starts to when a packet is actually transmitted or a time duration of a frame gap G.

Signal line 36: A time Data WT when a transmission packet #3 is written in the transmission buffer 104A is sent via this signal line.

Signal lines 108 and 109: Bit data is sent via the signal line 108 and a bit clock signal is sent via the signal line 109. The bit data and bit clock signal are obtained by the controller 103 by monitoring a transmission packet on the transmission path 106.

Signal line 110: A signal indicating a presence/absence of a packet #1 (FIG. 2A) on the transmission path 106 monitored by the controller 103 is sent via this signal line 110. Whether there is a packet on the transmission line 106 is determined based upon whether there is a carrier on the transmission line. This signal is called CASE-N.

Signal line 30: A time duration $T_1$ generated by the status controller 106 is sent via this signal line 110. The time duration $T_1$ is a transmission time duration of a transmission packet #1 (FIG. 2) on the transmission path 106. In reality, this time duration is a time duration from a time (SET) when a packet data length in a header of a packet frame is detected to a time when the packet data is transmitted completely.

Signal line 31: A signal indicating the data length detection time SET is sent via this signal line 31.

Signal line 32: A signal STWT indicating an output of a status code S (to be described later) on a signal line 71 is sent via this signal line 32.

Signal line 37: A signal CS indicating a transmission by another station is sent via this signal line 37.

Signal lines 51, 52, 53, and 54: Signals indicating the transmission order determining results are sent via these signal lines 51, 52, 53, and 54.

Figure 3A:
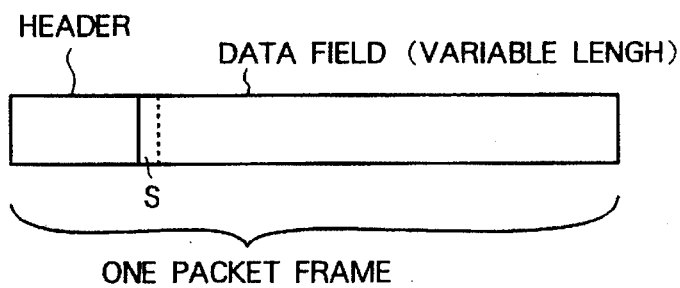
FIGS. 3A and 3B are diagrams showing the frame structures of packets.
Figure 3B:
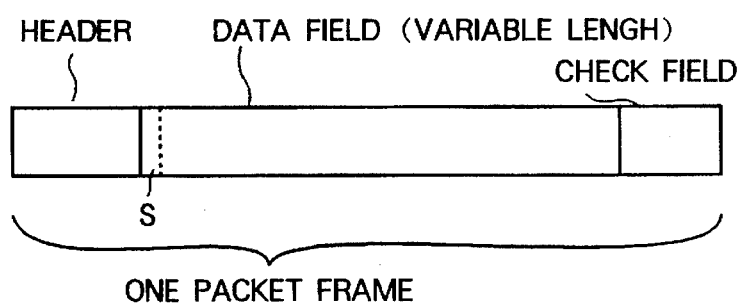

FIGS. 2A to 2F are diagrams explaining a method of determining a transmission order according to the invention. A packet #1 shown in FIG. 2A is a packet presently on the transmission path 106. A frame of one packet is illustrated in FIGS. 3A and 3B. One example of the frame shown in FIG. 3A is constituted by a start field called a header and a data field, and another example shown in FIG. 3B has a check field added after the data field. The check field is constituted by codes of an error check and a frame end. Both frames can be used by the CSMA/CD protocol. The header includes a start flag, a data length L of the data field, an originating address, a destination address, and other information, respectively necessary for the CSMA/CD protocol. A status code S indicating a permission/prohibition of intercepting a transmission, which is an important code of this embodiment, is set in the data field, for example, at its start bit. This code together with the header may be considered as a new header. This code S is a kind of a code indicating a priority order, and is added to the header of a transmission packet by an originating station ST when the packet is to be transmitted. If S=1, even if the transmission packet is on the transmission path, a transmission request from another station is acknowledged and the transmission of the packet is intercepted. On the other hand, if S=0, a transmission request issued from another station when the transmission packet is on the transmission path, is not acknowledged immediately. With this arrangement, in contrast to the concept of the earlier the better of the CSMA/CD protocol, whether a more urgent or important packet can be discriminated from the value of S. As a result, the demerit of the CSMA/CD protocol can be eliminated while the merit thereof is retained. Addition of S is authorized by the CSMA/CD protocol.

The data length of a packet is variable within the range of the maximum allowable data length $L_{max}$ in conformity with the CSMA/CD protocol. The header has a data length L to indicate the length of variable length data. Data longer than the maximum allowable data length $L_{max}$ is divided into two or more packets.

Transmission data has a plurality of data types, including numerical data such as accounting data, graphics data, text data, process data (further divided based upon what process it belongs to), process control data, software data, various types of input/output data, computed result data, and other data. These various data are transmitted by grouping packets into each data type. There are many cases that each data type is assigned a specific transmission period, i.e., each data type is assigned a time duration ($T_4$ shown in FIGS. 2B, 2D, and 2F) from the transmission request to the latest transmission start time $t_s$. It is convenient if a different transmission time duration $T_4$ is assigned to each data type. The transmission time duration $T_4$ may be shortened depending upon the urgency or importance of data. It is preferable to perform a transmission control (transmission time duration control, and transmission order control) of LAN while taking the transmission time duration $T_4$ into consideration.

Figure 3C:
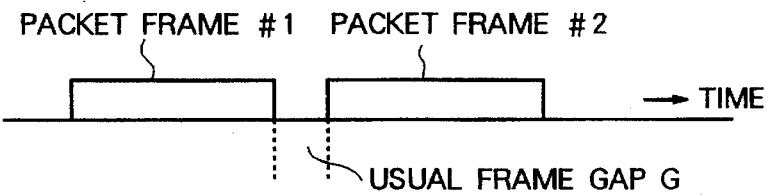
FIGS. 3C and 3D are diagrams showing frame gaps used for packet transmissions.
Figure 3D:
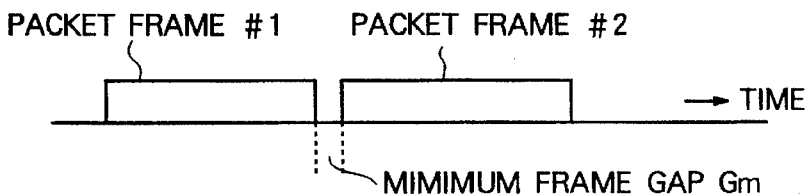

The CSMA/CD protocol assigns a duty to add a frame gap between consecutively transmitted packet frames. FIG. 3C shows a usual frame gap G, and FIG. 3D shows the minimum frame gap $G_m$ permitted for urgent or important packet frames. It is not permitted to transmit frame packets with a gap shorter than $G_m$. Data link is required to be able to receive a packet immediately after the preceding frame is transmitted or received. The term "immediately" herein means 9.6 μs which is the minimum frame gap time $G_m$ set for the recovery of data link. The usual gap G may be used if necessary.

With the CSMA/CD protocol, a collision will occur when transmission requests are issued at the same time from a plurality of stations. Upon occurrence of a transmission request collision, all transmission requests are rejected, and each transmission request is permitted after a lapse of a predetermined time. If a transmission request collision does not occur, the transmission request is allowed. A transmission request collision occurs also in this embodiment. How the transmission collision is dealt with in this embodiment will be described later.

FIG. 2A shows an example wherein an arbitrary station P transmitted two packets #1 and #2 with the frame gap G. The second packet #2 with the maximum packet length $L_{max}$ is added for the comprehensive explanation of a transmission order and a transmission time, and the first packet #1 has an arbitrary packet length. In response to a transmission request SEND-REQ for a packet #3 from another station I (different from the station P) during the transmission by the station P, transmission times and transmission orders are determined in three typical ways as shown in FIGS. 2B, 2D, and 2F. In FIG. 2B, the latest transmission start time $t_s$ is during the transmission of the first packet #1. In FIG. 2D, the latest transmission start time $t_s$ is during the transmission of the second packet #2 having the maximum data length $L_{max}$ in conformity with the CSMA/CD protocol. In FIG. 2F, the latest transmission start time $t_s$ is after the second packet #2 was transmitted. A transmission request is issued by an arbitrary station 104 on LAN and sent via the signal line 103A to the control circuit 103. The station 104 corresponds to a layer higher than the lower two physical and data link layers of the protocol. The timing when a transmission request is issued is determined in accordance with the configuration of the upper layer inclusive of the station. The controller 103 sets the transmission request SEND-REQ to be active high and outputs it to the signal line 33. The SEND-REQ signal is maintained active until the transmission is succeeded.

The latest transmission start time $t_s$ is the latest time when a packet including the frame gap G can be transmitted before a transmission completion time $t_e$ (called a dead line).

The method of determining a transmission time and a transmission order according to the embodiment will be described with reference to FIGS. 2A to 2F. The transmission time and order can be determined more easily by using $T_2$, $T_4$, and $T_M$ instead of using $t_s$. $T_2$ is a remaining transmission time duration of the packet #1, from a time when the transmission request SEND-REQ is issued to a transmission end time $t_j$ of the packet #1. $T_4$ is a time duration from the time when the transmission request SEND-REQ is issued to the latest transmission start time $t_s$. $T_M$ is a total time duration of the overhead time duration and a transmission time duration $T_{max}$ of the packet #2 with the maximum data length $L_{max}$ in conformity with the CSMA/CD protocol. The overhead time duration is a longer one of either a process time required for processes $F_1$ to $F_{23}$ or $F_1$ to $F_{27}$ shown in FIG. 5 to be described later, (i.e., various process times including a time required for writing a packet in the transmission buffer of a station ST and reading and transferring it to the controller 103 and a time required for transferring the packet from the controller 103 to the transmission path 106 ($F_{15}$ shown in FIG. 5), i.e., a time duration from when a packet transmission process starts to when the packet is actually transmitted), or the time duration of a frame gap.

Classification into various cases of the transmission order determining method of the invention will be described below.

1. Case of presence of data on the transmission path

[A]: Case of FIG. 2B, i.e., $T_4-T_2<0$

In the case of FIG. 2B, the packet #3 cannot be transmitted completely from the station I (104) before the last time $t_e$ if it is transmitted after the transmission packet #1 on the transmission path is transmitted completely. This case is further classified into the following two cases (a) and (b).

(a) Case of presence of data on the transmission line and packet status code S=1

In this case, transmission of the packet #1 on the transmission path can be intercepted. Therefore, when the transmission request SEND-REQ is issued, transmission of the packet #1 on the transmission path is intercepted (e.g., interception by transmitting a jam at $F_{15}$ of FIG. 5), and after the minimum frame gap $G_m$, S=0 is set to the packet #3 and the transmission starts (corresponding to $F_{15}$ in FIG. 5). S=0 set to the packet #3 means a prohibition of transmission by another station. The packet #3 shown in FIG. 2B is transmitted at time $t_s$ after time $t_i$, starting from the minimum frame gap $G_m$. However, according to the CSMA/CD protocol, the already transmitted data of the packet #1 is discarded or deleted when the transmission is intercepted. Therefore, the results are the same even if the transmission is intercepted at any time. In this embodiment, therefore, as shown in FIG. 2C, immediately after the transmission request is issued, the packet #3 is transmitted starting from minimum frame gap $G_m$. It is advantageous in that the packet #3 can be transmitted more earlier.

(b) Case of presence of data on the transmission line and packet status code S=0

In this case, transmission of the packet #1 on the transmission path cannot be intercepted. Therefore, even if the transmission request SEND-REQ is issued, the packet #3 is transmitted starting from the minimum frame gap $G_m$ after the packet #1 is transmitted completely. In this case, S=0 is set to the packet #3. In this case, the packet #3 is transmitted as the second best method after the packet #1 with S=0 on the transmission path is transmitted completely. Although the transmission of the packet #3 is completed after time $t_e$, the packet #3 is preferentially transmitted because S=0 is set so as not to be intercepted. Furthermore, since the minimum frame gap $G_m$ is used, the transmission request can be issued with a priority over other stations.

[B]: Case of FIG. 2D, i.e., $0 \leq (T_4-T_2)<T_M$

In this case, although the packet #3 can wait until the packet #1 is transmitted completely, if another packet (inclusive of the packet #2 having the maximum packet length $L_{max}$) is permitted to be transmitted, the packet #3 cannot be transmitted.

This case will occur when a packet is on the transmission path and its packet status code is S=1 or 0.

In this case, irrespective of whether transmission is permitted or not (irrespective of S=1 or 0), as shown in FIG. 2E, after the packet #1 is transmitted completely, the packet #3 added with S=0 starts being transmitted after the minimum frame gap $G_m$. Namely, S=0 is added to the packet #3 so as not to be intercepted, and the packet #3 is transmitted after the transmission completion of the packet #1 irrespective of S=1 or 0.

[C]: Case of FIG. 2F, i.e., $(T_4-T_2)>T_M$

In this case, even if the packet #2 with the maximum data length is inserted, the transmission completion time is ensured so that the packet #3 is transmitted with the usual frame gap after the transmission completion of the packet #1, irrespective of S=1 or 0 of the packet #1. Since the usual frame gap is used, a transmission order and a transmission time are controlled in the ordinary manner in conformity with the CSMA/CD protocol like other stations.

2. Case of no data on the transmission path

In this case, it is not necessary to check the code S, but a transmission time and a transmission time are controlled only through the comparison between $T_4$ and $T_M$. There are the following two cases [D] and [E].

[D]: Case of $T_4 \geq T_M$

In this case, even if the packet #2 with the maximum data length $L_{max}$ is transmitted, the transmission completion time of the packet #3 is ensured so that the transmission request is issued and the packet #3 set with S=1 is transmitted starting from the usual frame gap. This process is the same as the case [C].

[E]: Case of $T_4<T_M$

In this case, if the packet #2 with the maximum data length $L_{max}$ is transmitted, the transmission completion time of the packet #3 is not ensured so that the packet #3 set with not S=1 but S=1 is transmitted starting from the usual frame gap.

FIG. 4 is an embodiment of the internal structure of the transmission order selecting circuit 100. This embodiment is constituted by counters 2 and 4, latches 3 and 5, a comparator 6, a selection judging circuit 7, a latch 84, a comparator 81, AND gates 2A, 44A, 45A, 46A, 37B, 86A, 87A, an OR gate 83, and an inverter 37A.

The circuit shown in FIG. 4 has a function of classifying a packet into the above-described three cases [A] to [C] in accordance with the results of comparison between the time durations $T_2$ and $T_4$. The time duration T2 is a remaining transmission time duration of a transmission packet of a station P on LAN, from a time when another arbitrary station I issues a transmission request to a time when the transmission by the station P is completed. The time duration $T_4$ is the allowable latest transmission start time $t_s$ from when the transmission request SEND-REQ is issued by the station I. If the packet is transmitted at this latest transmission start time $t_s$, it can be transmitted before the dead line time $t_e$.

[A]: In this case, if a packet starts being transmitted after the transmission packet of the other station P is transmitted completely, the packet cannot be transmitted before the dead line time $t_e$.

[B]: In this case, if a packet starts being transmitted after the transmission packet of the other station P is transmitted completely and the transmission of another packet of another station Q is permitted, the packet cannot be transmitted before the dead line time $t_e$.

[C]: Cases other than the cases [A] and [B]

In the circuit shown in FIG. 4, the time durations $T_2$ and $T_4$ are calculated from time duration $T_1$ and T3 in order to classify a packet. The time duration $T_1$ (shown in FIG. 2A) is a transmission time duration of a packet under the transmission, and the time duration $T_3$ (shown in FIGS. 2B, 2D, and 2F) is the allowable latest transmission start time after the transmission packet is written in the transmission buffer of the station I.

Referring to FIG. 2A, while the packet #1 is on the transmission path, a signal CASE-N (outputted based on a signal on the transceiver cable reception line, and becoming inactive when a collision is detected) indicating a presence of a carrier is outputted via the controller 103 to the signal line 110. In accordance with the CASE-N signal on the signal line 110 and a transmission request SEND-REQ signal outputted from the controller 103 to the signal line 33, the status controller 102 shown in FIG. 1 outputs the CS signal (active high) indicating another station is transmitting, to the signal line 37.

The CS signal becomes active while another station is normally transmitting, and becomes inactive when the transmission of the other station is completed/intercepted. It is also inactive while its own station is transmitting or a collision is detected. The controller 103 shown in FIG. 1 separates the received bit stream into data and a clock signal PCLK. The data is outputted via the signal line 108 to the status controller 102, and the clock signal PCLK is outputted via the signal line 109 to the status controller 102. The status controller 102 receives data length information in the data field of the packet #1 by checking the inputs on the signal lines 108 and 109, calculates from the data length time duration $T_1$ required for the packet #1 to complete its transmission, outputs the value of the time duration $T_1$ to the signal line 30, and outputs a SET signal to the signal line 31. The SET signal becomes active when the value of $T_1$ is outputted to the signal line 30. In response to the SET signal supplied from the signal line 31, the counter 2 of the transmission order selecting circuit 100 is set with the value of $T_1$ supplied from the signal line 30 as its initial value. The status controller 102 shown in FIG. 1 receives information of the priority order status code S written in the data field of the packet #1 by using the inputs on the signal lines 108 and 109, outputs the status code S to the signal line 71, and outputs a STWT (active high) indicating an output of the status code S to the signal line 32. The STWT signal becomes inactive when the CS signal becomes inactive. The status code S takes a value of either "0" or "1".

An arbitrary station 104 on LAN writes information (packet #3) to be transmitted into the transmission buffer 104 (Data WT in FIGS. 2B to 2E). If a system designer or system user designates or designated the transmission completion time $t_e$ of the packet #3 (this case is called CASE-0), the time duration $T_3$ from Data WT to $t_s$ is read from a table by using the data type of the packet #3, and outputted to the signal line 35. A DataWT signal (active high) indicating that the station 104 has written the packet #3 into the transmission buffer 104A, is outputted to the signal line 36. A NOPRIO signal (active high) indicating that $T_3$ is not necessary to be designated, is made inactive (0 indicating $T_3$ was designated) and outputted to the signal line 36. If $T_3$ is not designated, the transmission completion time may be neglected or a predetermined time may be set independently from the data type. The counter 4 of the transmission order selecting circuit 100 is set with a value of $T_3$ supplied from the signal line 35 as its initial value, in response to the DataWT signal supplied from the signal line 36.

If a system designer or system user is not required to designate, or does not designate, the transmission completion time $t_e$ of the packet #3 (this case is called CASE-1), the NOPRIO signal is made active "1" and outputted to the signal line 38. In this case, the counter 4 is not required to be set with the initial value.

The controller 103 outputs a clock signal CLK to the signal line 34.

In the case of CASE-0, the counter 2 down-counts its initial value $T_1$ synchronously with the clock signal CLK, and outputs the down-count value to a signal line 39. The counter 4 down-counts its initial value $T_3$ synchronously with the clock signal CLK, and outputs the down-count value to a signal line 40. The latches 3 and 5 latch the input data on the signal lines 39 and 40 at the rising edge of the latch trigger signal on a signal line 41, and output them to signal lines 42 and 43.

Data latched by the latch 3, i.e., data on the signal line 42, is $T_2$ in FIGS. 2A to 2F, and data latched by the latch 5, i.e., data on the signal line 43, is $T_4$ in FIGS. 2B, 2D, and 2F.

The timing of the input data on the signal lines 42 and 43 is judged by using the signals on the signal lines 41 and 34, and at this timing, the data $T_2$ and $T_4$ on the signal lines 42 and 43 are compared. The comparison results are classified into SELa, SELb, and SELc signals (all active high), one of them is made active, and the signals are outputted to signal lines 44, 45, and 46.

The following definitions are used.

$DIF = T_4 - T_2$ $T_M$ = (overhead time) + (transmission time duration of packet #2 with the maximum packet length $L_{max}$ in conformity with the CSMA/CD protocol).

If DIF < 0, the case is [A] and the SELa signal is made active to set "1" to the signal line 44.

If $0 \leq DIF < T_M$, the case is [B] and the SELb signal is made active to set "1" to the signal line 45.

If $T_M \leq DIF$, the case is [C] and the SELc signal is made active to set "1" to the signal line 46.

If one of the signals SELa, SELb, and SELc becomes active while the signal line 37 is "1" (while another station is transmitting), a corresponding one of input signal lines 47, 48, and 49 of the selection judging circuit 7 becomes "1". The cases [A], [B], and [C] correspond to FIGS. 2B, 2D, and 2F.

If the signal line 37 is "0" (if another station is not transmitting), all the signal lines 47, 48, and 49 are "0".

After the comparison results of the comparator 6 are inputted to the selection judging circuit 7, the circuit 7 latches the signals on the signal lines 47, 48, and 49 and the status code S signal on the signal line 71, in response to the latch trigger signal on the signal line 41 and the clock signal CLK on the signal line 34.

When the signal line 38 is "0" (in the case of CASE-0), the selection judging circuit 7 performs the following operations.

(1) If the latched signal on the signal line 47 is active "1",
  (i) and if the latched code S=1, a signal line 51 is made active "1". This corresponds to the case [A].
  (ii) and if the latched code S=0, a signal line 52 is made active "1". This corresponds to the case [B].

(2) If the latched signal on the signal line 48 is active "1", the signal line 52 is made active "1" independently from the value of the latched code S. This corresponds to the case [B].

(3) If the latched signal on the signal line 49 is active "1", a signal line 80 is made active "1" independently from the value of the latched code S.

In the case of CASE-1 (where the NOPRIO signal is active), the signal line 38 is "1" and the selection judging circuit 7 sets "0" to all the signal lines 51, 52, and 80. Therefore, of the inputs to the OR gate 83, the signal line 80 is "0" and the signal line 38 is "1".

The circuit including the latch 80 and comparator 81 operates when there is no data carrier, i.e., when no packet is transmitted, and compares $T_4$ with $T_M$. The latch 84 latches data on the signal line 40 in response to the rising edge of the SEND-REQ signal on the signal line 33, and outputs it to a signal line 85. The data latched by the latch 84, i.e., the data on the signal line 85, is $T_4$ shown in FIG. 2. The timing of the input data on the signal line 85 is judged by using the signals on the signal lines 33 and 34, and at this timing, the comparator 81 compares $T_4$ on the signal line 85 with $T_M$.

If $T_4 < T_M$, a signal line 86 is made active "1", and if $T_M \leq T_4$, a signal line 87 is made active "1".

Under the conditions that the CS signal on the signal line 37 is inactive "0" and the SEND-REQ signal on the signal line 33 is active "1" (the signal line 82 is "1"), if the signal line 86 is active "1", the signal line 54 becomes "1", and if the signal line 87 is active "1", the signal line 50 becomes "1". If the signal line 82 is "0", both the signal lines 54 and 50 are "0".

The OR gate 83 outputs "1" to the signal line 53 if at least one of the inputs on the signal lines 80, 38, and 50 is "1".

According to the classification of this invention, a DO[A] signal is outputted via the signal line 51, a DO[B] signal is outputted via the signal line 52, a DO[E] signal is outputted via the signal line 54, and a DO[D] signal is outputted via the signal line 53, respectively to the controller 103.

In both the cases of CASE-0 and CASE-1, the controller 103 performs the following operations in accordance with the signals DO[A], DO[B], DO[E], and DO[D].

(1) If the signal line 51 (DO[A] signal) is active "1", transmission of the packet by another station P is intercepted, and after the minimum frame gap, a transmission packet added with the code S=0 is transmitted from its own station I. As a method of performing this operation by the controller 103, a method disclosed, for example, in Japanese Patent Laid-open Publication No. 2-149041 may be used.

(2) If the signal line 52 (DO[B] signal) is active "1", after the packet by another station P is transmitted completely and after the minimum frame gap, a transmission packet added with the code S=0 is transmitted from its own station I. As a method of performing this operation by the controller 103, a method disclosed, for example, in Japanese Patent Laid-open Publication No. 3-268534 may be used.

(3) If the signal line 54 (DO[E] signal) is active "1", a usual CSMA/CD protocol transmission process is performed. In this case, a packet added with the code S=0 is transmitted.

(4) If the signal line 53 (DO[D] signal) is active "1", a usual CSMA/CD protocol transmission process is performed. In this case, a packet added with the code. S=1 is transmitted.

In any one of the cases where the signals DO[A], DO[B], DO[E], and DO[D] are active, if a collision is detected during the transmission by its own station I or the transmission is not succeeded because of any fault, the transmission process is performed by a usual CSMA/CD protocol. The process after the success of transmission is performed by the controller 103 in accordance with the CSMA/CD protocol.

With the above arrangement, a packet with the active DO[A] signal can be transmitted completely before the transmission completion end time $t_e$, although it cannot be transmitted completely before $t_e$ if it is transmitted after the completion of the transmission by the other station P. Therefore, the real time function of the whole system can be improved. However, a packet with the active DO[A] signal cannot be transmitted under the following conditions.

(1) A collision occurs during a packet transmission by its own station after interception of a packet transmission by another station P and the minimum frame gap.

(2) A transmission is not succeeded because of a failure during a packet transmission.

With the above arrangement, although a transmission request of a packet with the active DO[E] signal (a packet which cannot be transmitted completely before time $t_e$ if transmission of another station Q is permitted after the completion of transmission by another station P) and a packet with the active DO[B] signal is issued during transmission by another station, the packet can be completely transmitted before time $t_e$ except the following conditions.

(1) The DO[B] signal is made active because of the code S=0 although the SELa signal is active.

(2) A collision occurs during a packet transmission by its own station after the completion of a packet transmission by another station P and the minimum frame gap.

(3) A transmission is not succeeded because of a failure or a collision during a packet transmission.

With the above arrangement, a packet with the active DO[D] signal can be transmitted completely before time $t_e$ even if transmission of another station Q is permitted after the completion of transmission by another station P. As a result, according to the present invention, it becomes possible to improve the real time performance of LAN by determining/controlling the transmission order of transmission packets, obeying the transmission order, and managing transmissions on LAN.

The controller 103 may not include the status code S information contained in the bit stream received from the transmission path 106, as the data to be transferred to the station 104.

Figure 5:
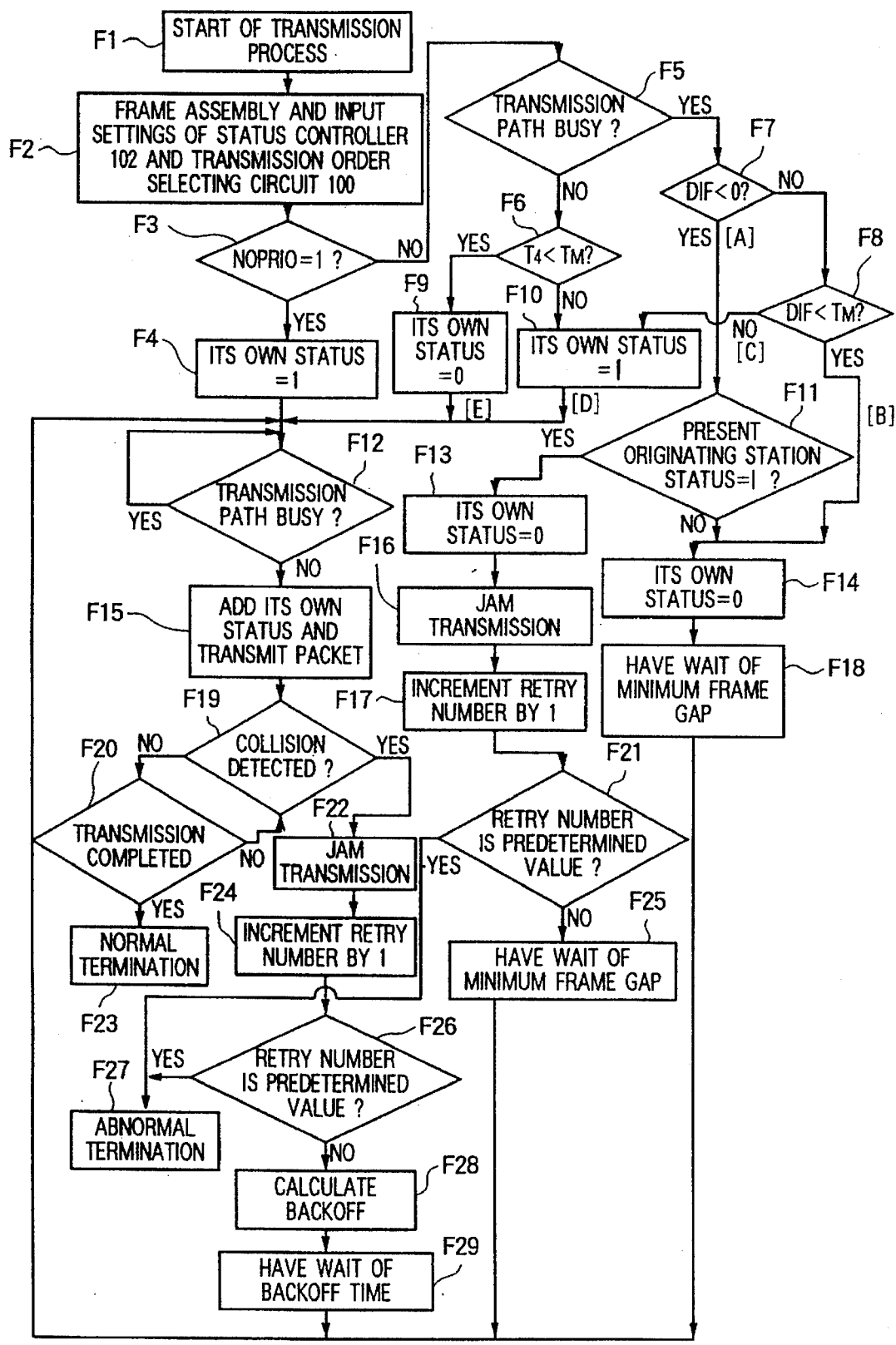
FIG. 5 is a flow chart explaining the operation of a transmission order determining method according to an embodiment of the invention.

FIG. 5 is a flow chart explaining the whole process of this embodiment. First, a transmission process starts (F1). A frame of a packet to be transmitted form its own station I is assembled, and the controller 103 and station 104 output the previously described signals necessary for the status controller 102 and transmission order selecting circuit 100. In this case, a packet to be preferentially transmitted is set with NOPRIO=0, and a packet to be normally transmitted is set with NOPRIO=1 (F2).

Next, it is checked from NOPRIO=1 or 0 whether a priority order of each assembled packet is to be designated, i.e., whether $T_3$ of each packet is to be designated with $T_3$ (F3).

If NOPRIO=1, it means a transmission mode without the designation of $T_3$ and the status code S=1 is set (F4). If NOPRIO=0, it means a transmission mode with the designation of $T_3$ and it is checked whether the transmission path is busy (F5). If busy, it means a packet is being transmitted on the transmission path. This is checked based upon whether a carrier is on the transmission path. If not busy, $T_4$ is compared with $T_M$ (F6). If $T_M > T_4$, the status code S=0 is set as the case [E] (F9). If $T_M \leq T_4$, the status code S=1 is set as the case [D] (F10).

If the transmission path is busy, it is checked whether the difference DIF=$(T_4-T_2)$ is smaller than 0 (F7). If the difference DIF=$(T_4-T_2)$ is smaller than 0, i.e., if the case is [A], it is checked whether status code S of the present originating station P is S=1 (F11). If S=1, the status code of the packet of its own station I is set to S=0 (F13). If the code of the packet of the station P is S=0, the status code of the packet of its own station I is set to S=0 (F14). Next, after a wait of the minimum frame gap Gm (F18), the packet is transmitted.

If the difference DIF=$(T_4-T_2)$ is equal to or larger than 0, it is checked whether the difference DIF=$(T_4-T_2)$ is smaller than $T_M$ (F8). If the difference DIF=$(T_4-T_2)$ is smaller than $T_M$ (F8), i.e., if the case is [B], the control advances to flow (F14) whereas its own status code is set to S=0. If the difference $DIF=(T_4-T_2)$ is equal to or larger than $T_M$ (F8), i.e., if the case is [C], the control advances to flow (F14) whereas its own status code is set to S=1. The resultant process is the same as the case [D].

After the completion of the process at flow (F13), a jam transmission is performed several times (F16), and each time a wait of the minimum frame gap $G_m$ is had. The jam is a signal for forcibly intercepting the transmission of a packet. The jam transmission is performed a predetermined number of retries (F21). If the jam transmission is performed the predetermined number of retries, it is judged to be abnormal and the control is terminated (F27).

It is checked at flow (F12) whether the transmission path is busy or not, and when the transmission path becomes not busy, the status code S is added to the packet to start transmitting (F15). Next, it is checked whether a collision on the transmission path occurs (F19). If a collision is detected, the processes same as at flows (F16, F17, and F21) are performed at (F22, F24, and F26). A backoff calculation is performed within the predetermined number of retries (F28), and a wait of the calculated time is had (F29). If the jam transmission is performed the predetermined number of retries, it is judged to be abnormal and the control is terminated (F27). The abnormality includes a transmission path abnormality and an abnormality of the controller 103.

The backoff is a binary exponential backoff, and is an algorithm used for determining a retransmission start time after an occurrence of a collision. A retransmission start time exponentially prolongs each time a collision occurs. In Ethernet, a retransmission is scheduled by a truncated binary exponential backoff with an upper limit of the retransmission interval.

The retransmission time interval T is given by the following equation.

$$T = \tau \times n$$

where $\tau$ is a constant called a time slot, and is 512 bits, and $n$ is a uniform random integer in the range given by the following formula.

$$0 \leq n < 2^k (k=\min(m,10))$$

where m is the number of collisions.

This backoff algorithm relieves the traffic congestion on a channel by exponentially prolonging the average retransmission time interval of the collided frame when the channel is congested as the collision increases. If the channel is not congested and only one or two collisions occur, the average retransmission time interval is shortened so as not to wait a long time. In this manner, this algorithm checks the congested channel from the number of collisions, and relieves the traffic congestion to avoid collisions. In addition, a proper retransmission time interval is determined so as to shorten the delay by collisions.

The other backoff algorithms are known as in the following.

(1) Constant scheme: $T=\tau \times n$ where n is a uniform random number in a predetermined range.

(2) Linear backoff scheme: $T=\tau \times n$ where n is a uniform random number in the range of $0 \leq n \leq m$ where m is the number of collisions.

If there is no collision (F19), it is checked whether the transmission has been completed. If completed, it is assumed to be normal, and the control is terminated (F23).

Figure 6:
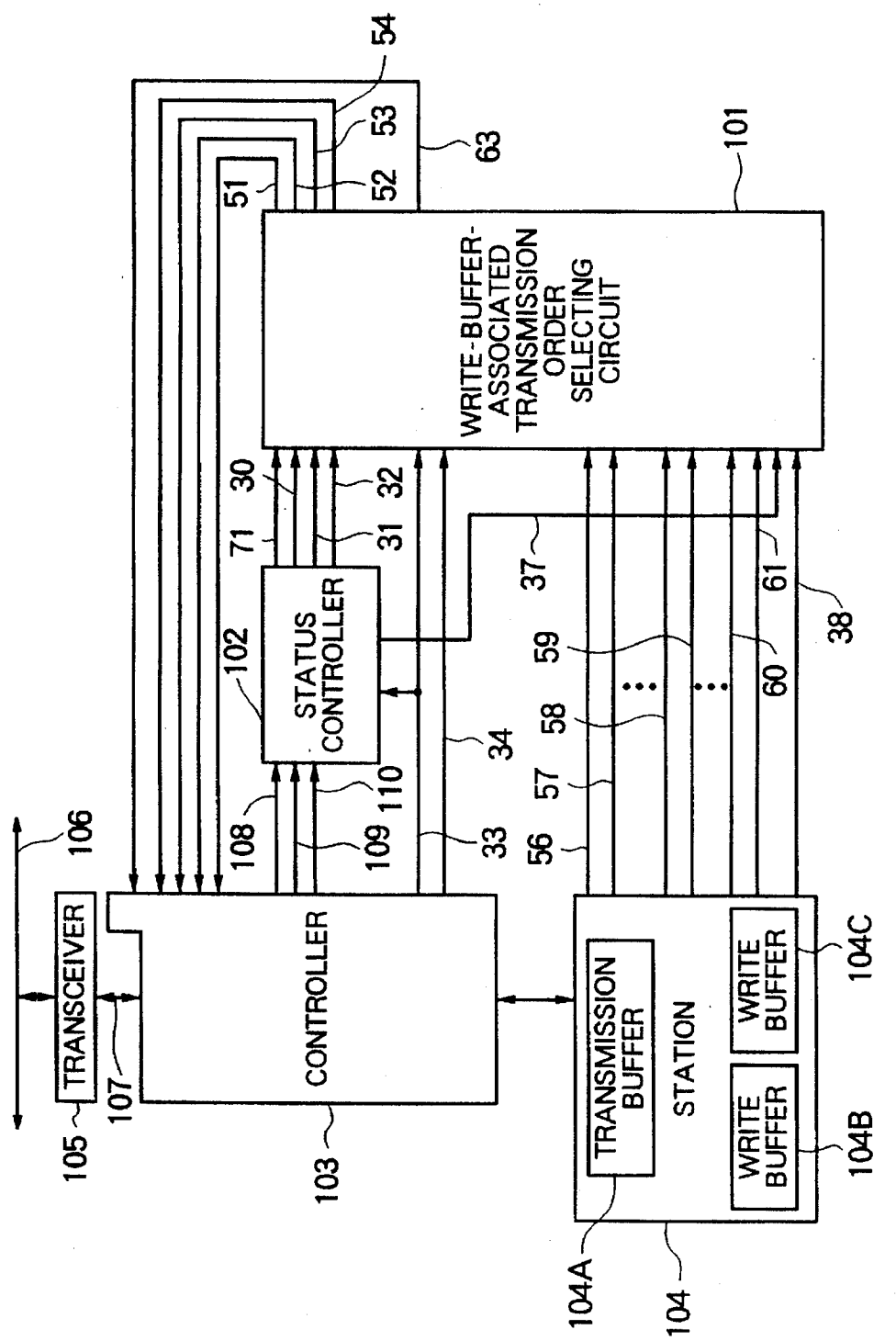
FIG. 6 is a circuit block diagram showing another embodiment of the invention.

FIG. 6 shows another embodiment of the invention which is characterized by a transmission order selecting process for a plurality of $n$ packets. Different points of FIG. 6 from FIG. 1 are that the station 104 has a plurality of packets to be transmitted, that there are signal lines for $T_3$ and DataWT for each packet (56 and 57), ..., (58 and 59), ..., and (60 and 61), and that a write-buffer-associated transmission order selecting circuit 101 for receiving and processing signals on the signal lines 56 to 61 is used in place of the transmission order selecting circuit 100 show in FIG. 1. The signal lines 56, ..., 58, ..., and 60 correspond to the signal line 35 shown in FIG. 1, and transfer a signal $T_3(i)$ ($1 \leq i \leq n$) corresponding to $T_3$ of each packet. The signal lines 57, ..., 59, ..., and 61 correspond to the signal line 36 shown in FIG. 1D, and transfer a signal DataWT(i) ($1 \leq i \leq n$) corresponding to DataWT of each packet. $i$ and $n$ are an integer.

Figure 7:
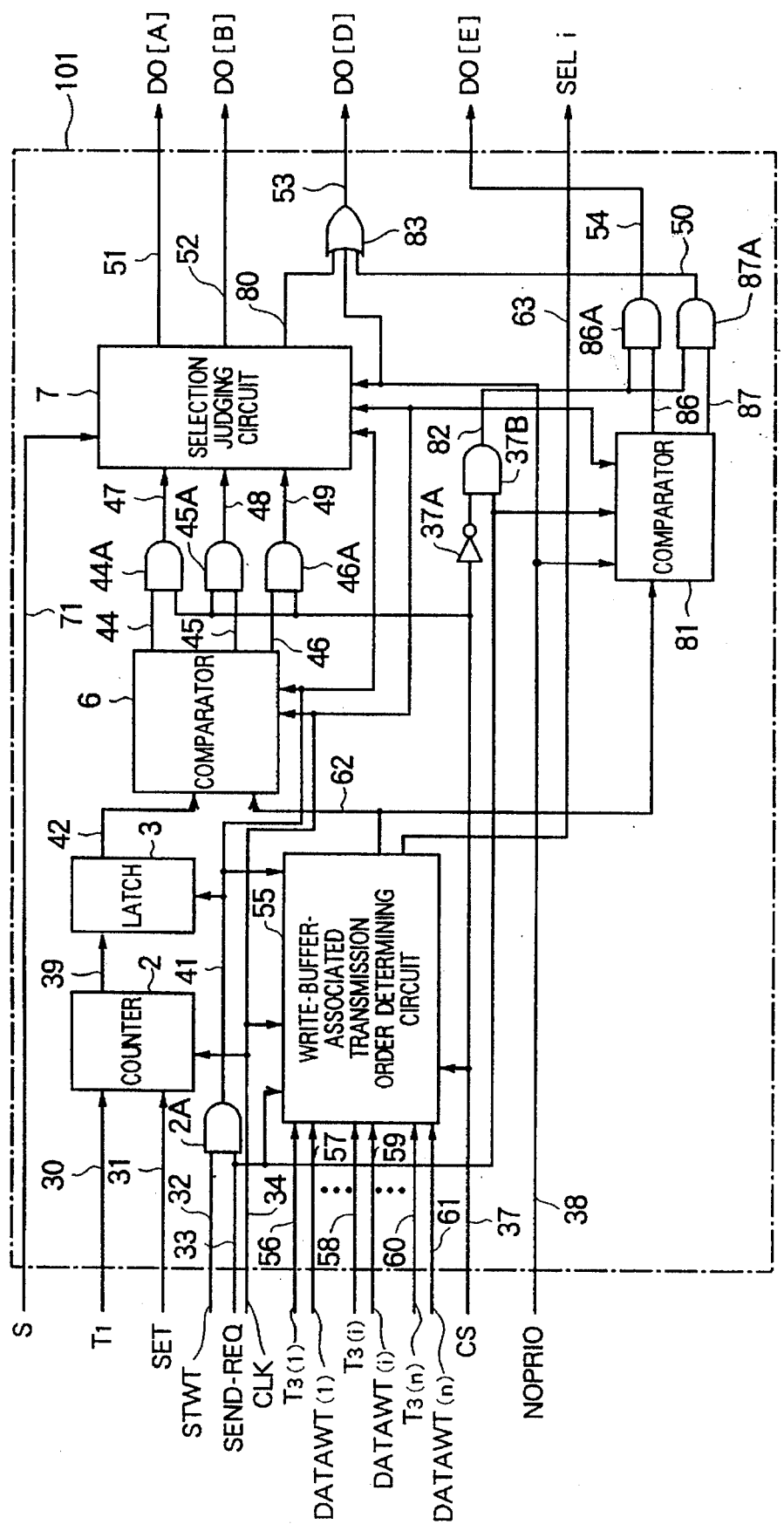
FIG. 7 is a diagram showing an embodiment of the transmission order selecting circuit shown in FIG. 6.

FIG. 7 shows the internal structure of the write-buffer-associated transmission order selecting circuit 101. The circuit 101 shown in FIG. 7 is used when there are a plurality of $n$ packets written in the transmission buffer of the station I, and has a function of selecting a packet, for which the transmission request is issued by the station I, having the latest transmission start time in order to complete transmission thereof before its transmission completion time, and a function of determining the transmission order of the packet like that shown in FIG. 4.

The write-buffer-associated transmission order selecting circuit 101 shown in FIG. 7 differs from the circuit 100 shown in FIG. 4 in that there is a write-buffer-associated transmission order determining circuit 55. This circuit 55 is used in place of the counter 4 and latches 5 and 84 shown in FIG. 1. FIG. 8 shows the internal structure of the write-buffer-associated transmission order determining circuit 55. This circuit 55 is constituted by counters 9, ..., 15, ..., and 11 corresponding to a plurality of packets, a selector 14, latches 10, 16, and 12, and a comparator 13.

An arbitrary station 104 on LAN writes an arbitrary i-th packet among a plurality of packets to be transmitted into the transmission buffer (Data WT in FIGS. 2A to 2F). If a system designer or system user designates the transmission completion time $t_e$ of the i-th packet (this case is hereinafter called CASE-0), the i-th packet is registered in a write buffer 104B for the write-buffer-associated transmission order determining circuit (this is called hereinafter a CASE-0 write buffer). The time duration $T_{3i}$ (corresponds to $T_3$ in FIGS. 2B, 2D, and 2F) from DataWT to $t_{si}$ (corresponds to $t_s$ in FIGS. 2B, 2D, and 2F) is outputted to the signal line 58. A DataWTi signal (active high) indicating that the station 104 has written the packet to be transmitted into the transmission buffer 104A, is outputted to the signal line 59. A NOPRIO signal (active high) indicating that $T_{3i}$ is not necessary to be designated, is made inactive and outputted to the signal line 38. The counter 15 of the write-buffer-associated transmission order determining circuit 55 is set with a value of $T_{3i}$ supplied from the signal line 58 as its initial value, in response to the DataWTi signal supplied from the signal line 59.

In writing the packet to be transmitted by the station 104 in the transmission buffer 104A, if a system designer or system user is not required to designate the transmission completion time $t_{ei}$ (corresponds to $t_e$ in FIGS. 2B, 2D, and 2F) (this case is called CASE-1), the i-th packet is registered in another write buffer 104C different from the CASE-0 write buffer 104B (this is called hereinafter a CASE-1 write buffer). If there is no packet still not transmitted in the CASE-0 write buffer 104B and if there is a packet still not transmitted in the CASE-1 write buffer 104C, the NOPRIO signal is made active. In this case, the counter 15 is not required to be set with the initial value.

If the NOPRIO signal is active, a packet still not transmitted in the CASE-1 write buffer 104C is transmitted in the manner described with FIG. 1 in the order of storing it in the CASE-1 write buffer 104C.

If there is a packet still not transmitted in the CASE-0 write buffer 104B, the time duration $T_{3i}$ from DataWT to $T_{si}$ designated by the system designer or system user is set to the counter 15 for the i-th packet shown in FIG. 8 as the initial value. The DataWTi signal is also inputted via the signal line 59 to the comparator 13. When an input (DATAiEN input) on the signal line 59 is made active "1", it is latched in the comparator 13. The counter 15 down-counts its initial value $T_{3i}$ synchronously with the clock signal CLK, and outputs the down-count value via the signal line 68 to the latch 16. The clock signal CLK is supplied via the signal line 34 from the controller 103. The latch 16 latches the input data in response to the rising edge of an output of the selector 14 supplied from the signal line 70. The data $T_{4i}$ latched by the latch 16 corresponds to $T_4$ shown in FIGS. 2B, 2D, and 2F, and is inputted via the signal line 69 to the Di input of the comparator 13. The selector outputs a signal on the signal line 41 to the signal line 70 when the signal line 37 is "1", and outputs a signal on the signal line 33 to the signal line 70 when the signal line 37 is "0". is an arbitrary value from 0 to n. If i is 0, the counter 9 corresponds to the counter 15 and the latch 10 corresponds to the latch 16, and if i is n, the counter 11 corresponds to the counter 15 and the latch 12 corresponds to the latch 16. The timing tcmp of the input data on the signal lines 65, 69, 67, . . . to inputs D0 to Dn of the comparator 13 is judged by using the signals on the signal lines 70 and 34, and at this timing, the Di ($1 \leq i \leq n$, i is an integer) inputs corresponding to DATA0EN to DATAnEN which are active at the timing tcmp, are compared. The serial number i having the minimum value Di is outputted to the signal line 63 and the Di is outputted to the signal line 62. If there are a plurality of serial numbers having the minimum value, the corresponding DATAiEN signals are checked, and the serial number set to the counter earlier is outputted.

The controller 103 can know from an output on the signal line 63 which data was selected by the write-buffer-associated transmission order determining circuit 55. The Di, i.e., $T_{4i}$ is inputted via the signal line 62 to the comparator 6 shown in FIG. 7. The signal line 62 is also connected to an input of the comparator 81, and corresponds to the signal line 85 of the comparator 81 shown in FIG. 4. The other operations are the same as the first embodiment.

According to the second embodiment of the invention, even if there are n packets of #1~#n to be transmitted in the transmission buffer of an arbitrary station I of LAN, the transmission process can start from the packet having the shortest time to $t_e$. As a result, it becomes possible to improve the real time performance of LAN by determining/controlling the transmission order of transmission packets, obeying the transmission order, and managing transmissions on LAN.

The present invention is not limited only to the above embodiments, but includes various embodiments wherein the transmission order is determined in accordance with various packet importance degrees and transmission request times. The invention includes various modifications without departing from the scope as defined by the appended claims.

What is claimed is:

1. A method of automatically determining a transmission order of a packet for a local area network using the CSMA/CD protocol, comprising the steps of:

in transmitting a packet from an arbitrary station I on the local area network while another station P is transmitting a packet, automatically performing a classification of the packet from the station I into:

a group A if a transmission process for the packet from station I cannot be completed at station I before a requested end of transmission time because transmission of the packet from station I started after the packet from station P was transmitted completely, a group B if a transmission for the packet from station I cannot be completed at station I before a requested end of transmission time because transmission of a packet from another station Q was permitted after transmission of a packet from station P has been completed, or a group C if a transmission for the packet from station I does not belong to either of groups A and B; and performing a transmission process of the packet from station I in accordance with a result of said classification, wherein if the packet from station I is classified in said group A, the packet is transmitted from station I, when station I has intercepted a transmission from station P, and when the packet from station P does not inhibit an interception of a transmission of a packet from a station other than station P to station P, and wherein if the packet from station I is classified in said group B, the packet is transmitted from station I after the transmission of the packet from station P has been completed.

2. A method of automatically determining a transmission order of a packet for a local area network according to claim 1, wherein said classifying step includes the steps of:

obtaining a time duration $T_2$ from a generation of a packet transmission request by station I to a transmission completion of a presently transmitted packet;

obtaining a time duration $T_4$ from the generation of the packet transmission request to a transmission start time, allowing transmission to be completed by said end of transmission time; and classifying the packet into said group A when $T_4 < T_2$.

3. A method of automatically determining a transmission order of packet for a local area network according to claim 2, wherein said automatic classification step includes the steps of:

obtaining a difference between the time durations $T_2$ and $T_4$; and classifying the packet into said group B when said difference is less than a time duration $T_M$ and into said group C when said difference is greater than said time duration $T_M$, said time duration $T_M$ being equal to a frame gap time plus a time required for transmitting a packet having a maximum packet length.

4. A method of automatically determining a transmission order of a packet for a local area network according to claim 2, wherein said transmission process performing step includes the steps of: if $(T_4 - T_2) < 0$, intercepting a transmission of the packet from station P;

waiting a minimum frame gap; and adding a code to a transmission packet from station I and transmitting the transmission packet, the code indicating that the transmission packet from station I is not permitted to be intercepted.

5. A method of automatically determining a transmission order of a packet for a local area network according to claim 3, wherein said transmission process performing step includes the steps of: if $0 \leq (T_4 - T_2) < T_M$, intercepting a transmission of the packet of the other station P;

waiting a minimum frame gap after the packet of the other station is transmitted completely; and adding a code to a transmission packet of the station I and transmitting the transmission packet, the code indicating that the transmission packet is not permitted to be intercepted.

6. A method of automatically determining a transmission order of a packet for a local area network according to claim 3, wherein said transmission process performing step includes the step of, if $T_M \leq (T_4-T_2)$, adding a code to the packet requested for transmission and transmitting the packet, the code indicating that the packet is not permitted to be intercepted.

7. A method of automatically determining a transmission order of a packet for a local area network according to claim 3, wherein said transmission process performing step includes the step of, if $T_M \leq (T_4-T_2)$, adding a code to the packet requested for transmission and transmitting the packet, the code indicating that the packet is permitted to be intercepted.

8. A method of automatically determining a transmission order of a packet for a local area network according to claim 1, wherein said classifying step includes the step of, if there are a plurality of information sets to be transmitted in a transmission buffer of the station I, selecting an information set from the plurality of information sets as a packet which issues a request for transmission, the information set selected allowing a shortest time until a transmission end time.

9. A method of automatically determining a transmission order of a packet for a local area network according to claim 8, wherein said classifying step includes the step of, selecting an information set (k) as a packet which issues a request for transmission, the information set (k) allowing a shortest time duration from a generation of a transmission request to a transmission start time which is allowed based on a transmission end time.

10. A method of automatically determining a transmission order of a packet for a local area network according to claim 9, wherein said classifying step includes the steps of:

obtaining a time duration $T_4(k)$ for the information set (k) from generation of the packet transmission request to a transmission start time;

obtaining a time duration $T_2$ from a generation of a packet transmission request by station I to a transmission completion of a presently transmitted packet; and classifying the packet into said group A when $T_4(k) < T_2$.

11. A method of automatically determining a transmission order of a packet for a local area network according to claim 10, wherein said automatic classification step includes the steps of:

obtaining a difference between the time durations $T_2$ and $T_4(k)$; and classifying the packet into said group B when said difference is less than a time duration $T_M$, and into said group C when said difference is greater than said time duration $T_M$, said time duration $T_4$ being equal to a frame gap time plus a time required for transmitting a packet having a maximum packet length.

12. A method of automatically determining a transmission order of a packet for a local area network according to claim 10, wherein said transmission process performing step includes the steps of: if $(T_4(k)-T_2) < 0$, intercepting a transmission of the packet of the other station P;

waiting a minimum frame gap; and adding a code to a transmission packet of the station I and transmitting the transmission packet, the code indicating that the transmission packet is not permitted to be intercepted.

13. A method of automatically determining a transmission order of a packet for a local area network according to claim 11, wherein said transmission process performing step includes the steps of: if $0 \leq (T_4(k)-T_2) < T_M$, intercepting a transmission of the packet of the other station P;

waiting a minimum frame gap after the packet of the other station is transmitted completely; and adding a code to a transmission packet of the station I and transmitting the transmission packet, the code indicating that the transmission packet is not permitted to be intercepted.

14. A method of automatically determining a transmission order of a packet for a local area network according to claim 11, wherein said transmission process performing step includes the step of, if $T_M \leq (T_4(k)-T_2)$, adding a code to the packet requested for transmission and transmitting the packet, the code indicating that the packet is not permitted to be intercepted.

15. A method of automatically determining a transmission order of a packet for a local area network according to claim 11, wherein said transmission process performing step includes the step of, if $T_M \leq (T_4(k)-T_2)$, adding a code to the packet requested for transmission and transmitting the packet, the code indicating that the packet is permitted to be intercepted.

16. A method of transmitting a packet in a local area network using the CSMA/CD protocol, comprising the steps of:

in transmitting a first packet from an arbitrary station P connected to the local area network, adding a code to the first packet and transmitting the first packet, the code indicating an importance degree of the first packet concerning whether transmission of the first packet is permitted to be intercepted;

in transmitting a second packet from an arbitrary station I connected to the local area network during transmission of the first packet, performing the steps of:

determining a transmission timing in accordance with an important degree of the second packet and a transmission end time required for the second packet, and when it is determined according to the determining step that it is necessary to intercept the transmission of said first packet and transmit said second packet, if said code indicating the importance degree of said first packet represents "not important", the transmission of said first packet is intercepted and said second packet is transmitted, and if said code indicating the importance degree of said first packet represents "important", said second packet is transmitted after a time corresponding to a minimum frame gap after the transmission of said first packet has been completed.

17. A method of transmitting a packet according to claim 16, wherein said step of determining a transmission timing includes the steps of:

performing a classification of the packet from station I into:

a group A if a transmission process for the packet from station I cannot be completed at station I before a requested end of transmission time because transmission of the packet from station I started after the first packet from station P was transmitted completely, or a group B if a transmission process for the packet from station I cannot be completed at station I before a requested end of transmission time because transmission of a packet from another Q was permitted after the first packet from station P was transmitted completely, or a group C if the packet from station I does not belong to either of groups A and B; and performing a transmission process of the packet in accordance with a result of said classification, wherein if the packet from station I is classified in said group A, the packet is transmitted from station I, when station I has intercepted a transmission from station P, and when the packet from station P does not inhibit an interception of a transmission of a packet from a station other than station P to station P, and wherein if the packet from station I is classified in said group B, the packet is transmitted from station I after the transmission of the packet from station P has been completed.

18. A method of transmitting a packet according to claim 17, wherein said step of determining a transmission timing includes the step of, if there are a plurality of information sets to be transmitted, selecting an information set from the plurality of information sets as a packet which issues a request for transmission, the information set selected allowing a shortest time with a transmission end time.

19. An apparatus for automatically determining a transmission order of a packet for a local area network using the CSMA/CD protocol, comprising:

means for, in transmitting a packet from an arbitrary station I connected to the local area network while another station P is transmitting a packet, automatically performing a classification of the packet from station I into:

a group A if a transmission process for the packet from station I cannot be completed at station I before a requested end of transmission time because transmission of the packet from station I started after the packet from station P was transmitted completely, or a group B if a transmission process for the packet from station I cannot be completed at station I before a requested end of transmission time because transmission of a packet from another station Q was permitted after transmission of the packet from the other station P was transmitted completely, or a group C if the packet from station I does not belong to either groups of A and B; and means for performing a transmission process of the packet in accordance with a result of said classification, wherein if the packet from station I is classified in said group A, the packet is transmitted from station I, when station I has intercepted a transmission from station P, and when the packet from station P does not inhibit an interception of a transmission of a packet from a station other than station P to station P, and wherein if the packet from station I is classified in said group B, the packet is transmitted from station I after the transmission of the packet from station P has been completed.

20. An apparatus for automatically determining a transmission order of a packet for a local area network according to claim 19, wherein said classifying means includes:

means for obtaining a remaining transmission time duration $T_1$ of the packet under transmission by the other station P in accordance with data length information in a length field of the packet;

means for obtaining the latest transmission start time $T_3$ allowing transmission to complete by a requested time, from a time when information to be transmitted by the station I into a transmission buffer;

first count means for counting down the time duration $T_1$ as a initial value synchronously with a clock;

second count means for counting down the time $T_3$ as an initial value synchronously with the clock;

first latch means for latching an output of said first count means when a transmission request by the station I becomes active and a priority order status has reached from the other station P to the station I;

second latch means for latching an output of said second count means when a transmission request by the station I becomes active and a priority order status has reached from the other station P to the station I;

comparison means for comparing outputs of said first and second latch means; and classifying a packet transmission timing in accordance with an output of said comparison means.

21. An apparatus for automatically determining a transmission order of a packet for a local area network according to claim 19, wherein said classifying means includes:

means for obtaining a time duration $T_2$ from a generation of a packet transmission request by station I to a transmission completion of a presently transmitted packet;

means for obtaining a time duration $T_4$ from the generation of the packet transmission request to a transmission start time, allowing transmission to complete by said end of transmission time; and means for classifying the packet into said group A when $T_4 < T_2$.

22. An apparatus for automatically determining a transmission order of a packet for a local area network according to claim 21, wherein said classifying means includes:

means for obtaining a difference between the time durations $T_2$ and $T_4$; and means for classifying the packet into said group B when said difference is less than a time duration $T_M$, and into said group C when said difference is greater than said time duration $T_M$, said time duration $T_M$ being equal to a frame gap time plus a time required for transmitting a packet having maximum packet length.

23. An apparatus for automatically determining a transmission order of a packet for a local area network according to claim 21, wherein said transmission performing means includes: if $(T_4-T_2) < 0$, means for intercepting a transmission of the packet of the other station P;

means for waiting a minimum frame gap; and means for adding a code to a transmission packet of the station I and transmitting the transmission packet, the code indicating that the transmission packet is not permitted to be intercepted.

24. An apparatus for automatically determining a transmission order of a packet for a local area network according to claim 22, wherein said transmission process performing means includes: if $0 \leq (T_4-T_2) < T_M$, means for intercepting a transmission of the packet of the other station P;

means for waiting a minimum frame gap after the packet of the other station is transmitted completely; and means for adding a code to a transmission packet of the station I and transmitting the transmission packet, the code indicating that the transmission packet is not permitted to be intercepted.

25. An apparatus for automatically determining a transmission order of a packet for a local area network according to claim 22, wherein said transmission process performing means includes, if $T_M \leq (T_4 - T_2)$, means for adding a code to the packet requested for transmission and transmitting the packet, the code indicating that the packet is not permitted to be intercepted.

26. An apparatus for automatically determining a transmission order of a packet for a local area network according to claim 22, wherein said transmission process performing means includes, if $T_M \leq (T_4 - T_2)$, means for adding a code to the packet requested for transmission and transmitting the packet, the code indicating that the packet is permitted to be intercepted.

27. An apparatus for automatically determining a transmission order of a packet for a local area network according to claim 19, wherein said classifying means includes means for, if there are a plurality of information sets to be transmitted in a transmission buffer of the station I, selecting an information set from the plurality of information sets as a packet which issues a request for transmission, the information set selected allowing a shortest time until a transmission end time.

28. An apparatus for automatically determining a transmission order of a packet for a local area network according to claim 27, wherein said selecting means includes means for selecting an information set (k) as a packet which issues a request for transmission, the information set (k) allowing a shortest time duration from a generation of a transmission request to a transmission start time which is allowed based on a transmission end time.

29. An apparatus for automatically determining a transmission order of a packet for a local area network according to claim 27, wherein said classifying means includes:

means for obtaining a remaining transmission time duration $T_1$ of the packet under transmission by the other station P in accordance with data length information in a length field of the packet;

first count means for counting down the time duration $T_1$ as a initial value synchronously with a clock;

first latch means for latching an output of said first count means when a transmission request by the station I becomes active and a priority order status has reached from the other station P to the station I;

means for obtaining, if there are a plurality of n information sets at the station I, for each information set the latest transmission start time $T_3(i)$ allowing transmission to complete by a requested time, from a time when information to be transmitted by the station I into a transmission buffer, where $i$ is an integer of $1 \leq i \leq n$;

a plurality of second count means provided for each information set for counting down the time duration $T_3(i)$ as a initial value synchronously with a clock;

a plurality of second latch means provided for each information set for latching an output of each of said plurality of second count means when a transmission request by the station I becomes active and a priority order status has reached from the other station P to the station I during transmission by the other station;

first comparison means for comparing outputs of said plurality of second latch means;

second comparison means for comparing an output of said first comparison means with an output of said first latch means;

means for classifying a packet transmission timing in accordance with an output of said second comparison means; and means for performing a packet transmission process in accordance with an output of said classifying means.

30. A local area network using the CSMA/CD protocol, comprising:

means for, in transmitting a first packet from an arbitrary station P connected to the local area network, adding a code to the first packet and transmitting the first packet, the code indicating an importance degree of the first packet concerning whether transmission of the first packet is permitted to be intercepted; means for, in transmitting a second packet from an arbitrary station I connected to the local area network during transmission of the first packet, determining a transmission time in accordance with an importance degree of the second packet and a transmission end time requested for the second packet; and means for controlling, when it is determined according to the determining means that it is necessary to intercept the transmission of said first packet and transmit said second packet, if said code indicating the importance degree of said first packet represents "not importance", the transmission of said first packet is intercepted and said second packet is transmitted, and if said code indicating the importance degree of said first packet represents "important", said second packet is transmitted after a time corresponding to a minimum frame gap after the transmission of said first packet has been completed.

31. A local area network according to claim 30, wherein said means for determining a transmission timing includes means for, if there are a plurality of information sets to be transmitted, selecting an information set from the plurality of information sets as a packet which issues a request for transmission, the information set selected allowing a shortest time until a transmission end time.

32. A local area network according to claim 30, wherein said means for determining a transmission timing includes means for performing a classification of the packet of station I into:

a group A if a transmission process for the second process packet cannot be completed at station I before a requested end of transmission time because transmission of the second packet started after the first packet from station P was transmitted completely, or a group B if a transmission process for the second packet cannot be completed at station I before a requested end of transmission time because transmission packet from another station Q was permitted after the first packet from station P was transmitted completely, or a group C if the packet does not belong to either of groups A and B.

* * * * *